United States Patent
Imamura et al.

(10) Patent No.: US 7,746,027 B2
(45) Date of Patent: Jun. 29, 2010

(54) ELECTRIC POWER CONTROLLER FOR VEHICLE MOUNTING

(75) Inventors: Kimihiko Imamura, Iida (JP); Masakazu Okaniwa, Iida (JP)

(73) Assignee: OMRON Corporation, Kyoto (JP)

( * ) Notice: Subject to any disclaimer, the term of this patent is extended or adjusted under 35 U.S.C. 154(b) by 678 days.

(21) Appl. No.: 11/789,460

(22) Filed: Apr. 24, 2007

(65) Prior Publication Data
US 2007/0252584 A1    Nov. 1, 2007

(30) Foreign Application Priority Data
Apr. 24, 2006    (JP) .............. 2006-118653

(51) Int. Cl.
H02J 7/14    (2006.01)
H02H 3/00    (2006.01)
G01R 19/00   (2006.01)
(52) U.S. Cl. ................ 320/104; 361/86; 702/64
(58) Field of Classification Search ............. 320/104; 361/86; 702/64
See application file for complete search history.

(56) References Cited
U.S. PATENT DOCUMENTS
4,306,218 A    12/1981   Leconte et al.
5,424,894 A *  6/1995   Briscall et al. ............. 361/45
6,259,227 B1 * 7/2001   Gherman et al. ........... 320/101
2005/0057865 A1  3/2005  Veloo et al.
2005/0060067 A1  3/2005  Nishida
2006/0058897 A1  3/2006  Senda et al.

FOREIGN PATENT DOCUMENTS
DE    42 39 500 A1    5/1994
JP    2004-273172     9/2004

OTHER PUBLICATIONS
European Search Report dated Sep. 24, 2007 issued in European Application No. 07106775.5-2007, 7 pages.
English language abstract of Publication No. DE4239500 published May 26, 1994, esp@cenet, 1 page.

* cited by examiner

Primary Examiner—Edward Tso
Assistant Examiner—Richard V Muralidar
(74) Attorney, Agent, or Firm—Osha • Liang LLP

(57) ABSTRACT

In an electric power controller for vehicle mounting, an input voltage supplied through a harness and a threshold value are compared, and the input voltage applied to load is interrupted when the input voltage is smaller than the threshold value. The electric power controller for vehicle mounting includes a voltage drop detector for detecting a voltage drop amount of the harness; and a threshold value setting device in which a voltage provided by subtracting the voltage drop amount of the harness from a predetermined protecting voltage is set as the threshold value.

4 Claims, 4 Drawing Sheets

ELECTRIC POWER CONTROLLER FOR VEHICLE MOUNTING

BACKGROUND OF THE INVENTION

1. Field of the Invention

The present invention relates to an electric power controller for vehicle mounting, and particularly relates to a device for controlling electric power supply to load of large consumed electric power, especially, an electric power controller for vehicle mounting having a preventing function of a battery rise.

2. Description of the Related Art

In various electric mounting products mounted to a vehicle, considerably large electric power is consumed in e.g., an audio system of large output and a front illuminating light of a xenon system, etc. Therefore, a burden on the battery is large. Further, a commercial electric power converter (a machine for converting a battery voltage into commercial electric power of AC100V) able to use a domestic appliance such as television, etc. is also arranged in accordance with vehicles. The battery burden is also large when such a domestic appliance is used.

Therefore, when the electric mounting product and the electric product of large electric power consumption (these are generically called load in this specification) are used, for example, the battery voltage is monitored as shown in the following patent document 1. When this battery voltage is smaller than a predetermined reference voltage, electric power supply to the load is interrupted and the battery rise is prevented.

FIG. 4 is a view showing a conventional electric power controller for vehicle mounting. In this figure, a battery 1 can be charged by a dynamo 3 operated by an engine 2. A terminal voltage (hereinafter called battery voltage Vb) of the battery 1 is supplied to load 6 through a harness 4 and an electric power controller 5.

The electric power controller 5 interrupts an electric current i when an input voltage is smaller than a predetermined judging reference voltage (hereinafter called a threshold value SL). For example, the load 6 is an audio system of large output, a front illuminating light of a xenon system, etc. or a domestic appliance such as television, etc. in accordance with the above illustration. However, when the load 6 is set to the domestic appliance, the electric power controller 5 is also used as a commercial electric power converter. Namely, in this case, in addition to the above electric current interrupting function, the electric power controller 5 can convert voltage Vb_in of a load side terminal of the harness 4 into commercial electric power of AC100V and supply this commercial electric power to the load 6.

Here, when a lowest voltage of the battery 1 required to start the engine 2 is set to be called a protecting voltage Vh, the electric current i to the load 6 is interrupted to protect the battery 1 when the battery voltage Vb is smaller than the protecting voltage Vh. Accordingly, it seems that it is sufficient to set the threshold value SL of the electric power controller 5 to the same value as the protecting voltage Vh. However, in reality, the threshold value SL must be set to a value lower by a certain voltage than the protecting voltage Vh. This is because an input voltage of the electric power controller 5 is voltage Vb_in of the load side terminal of the harness 4, and this voltage Vb_in is lower than the battery voltage Vb by a voltage given by a product (ixR) of the electric current (electric current i flowed to the load 6) flowed to the harness 4 and a resistance value R of the harness 4. The voltage given by this ixR is next called a correction voltage Ref.

For example, in the prior art described in the following patent document 1, when an electric power voltage (corresponding to the above voltage Vb_in) of a direct current power source (corresponding to the above battery 1) becomes lower than 6 V (corresponding to the above predetermined voltage SL), electric current supply to a high brightness discharge light (corresponding to the above load 6) is interrupted and this discharge light is turned off (see paragraph number [0041], etc. of the same document). In accordance with the above idea, the threshold value SL (=6V) in such a prior art is SL=Vh−Ref. Accordingly, for example, if i=10A and R=0.2Ω, Ref=ixR=2V is formed and 6V=Vh−2V, therefore, Vh=8V is formed. Accordingly, when the battery voltage Vb is smaller than 8V, the electric current i to the load 6 can be interrupted and the battery rise can be prevented.

[Patent document 1] JP-A-2004-273172

However, in the former electric power controller for vehicle mounting, there are the following problems since the threshold value SL is set to a fixed value set in advance.

As mentioned above, SL=Vh−Ref, and Vh is a tentative standard of battery protection so that Vh may be a fixed value. However, fixed Ref causes incongruence for the following reasons. Since Ref is given by the product (ixR) of the electric current i of the load 6 and the resistance value R of the harness 4, the actual ixR and the fixed Ref are not conformed when the load 6 is changed and the harness 4 is changed.

A first case of the unconformity is a case in which "Ref>actual ixR" is formed. In this case, if the difference between both the voltages is set to α, i.e., if Ref=(ixR)+α is set, the electric current i is interrupted when the battery voltage Vb is smaller than "protecting voltage Vh+voltage α". Therefore, the trouble that protecting ability of the battery is reduced by the voltage α and the battery rise is easily generated is finally caused.

On the other hand, a second case of the above unconformity is a case in which "Ref<actual ixR" is formed reversely to the above case. In this case, if the difference between both the voltages is α, i.e., if Ref=(ixR)−α is set, the electric current i is interrupted when the battery voltage Vb is smaller than "protecting voltage Vh−voltage α". Accordingly, in this case, a protecting function of the battery 1 is early fulfilled by the voltage α. Therefore, the trouble that performance (charging state) of the battery 1 is sufficient, but no load 6 can be used is caused.

SUMMARY OF THE INVENTION

Therefore, an object of the present invention is to provide an electric power controller for vehicle mounting able to adaptively set a judging reference voltage (threshold value) for interrupting a load electric current, and able to flexibly cope with a change of the load, a change of the harness, etc.

The electric power controller for vehicle mounting in the present invention is an electric power controller for vehicle mounting in which a input voltage supplied through a harness and a threshold value are compared, and the input voltage applied to load is interrupted when the input voltage is smaller than the threshold value;

the electric power controller for vehicle mounting comprising:

voltage drop detecting means for detecting a voltage drop amount of the harness; and threshold value setting means in which a voltage provided by subtracting the voltage drop amount of the harness from a predetermined protecting voltage is set as the threshold value.

The electric power controller for vehicle mounting in the present invention is also an electric power controller for vehicle mounting in which a input voltage supplied through a harness and a threshold value are compared, and the input voltage applied to load is interrupted when the input voltage is smaller than the threshold value;

the electric power controller for vehicle mounting comprising:

voltage drop detecting means for detecting a voltage drop amount of the harness;

electric current detecting means for detecting an electric current flowed to the load;

resistance value arithmetic means for arithmetically calculating a resistance value of the harness from the voltage drop amount of the harness and the electric current flowed to the load;

resistance value replacing means for outputting the resistance value as it is if no resistance value arithmetically calculated by the resistance value arithmetic means is greater than a predetermined upper limit resistance value, and replacing the resistance value with the upper limit resistance value and outputting this upper limit resistance value if the resistance value is greater than the predetermined upper limit resistance value;

correction voltage arithmetic means for calculating a product of the resistance value outputted from the resistance value replacing means and the electric current flowed to the load, and setting its result to a correction voltage; and threshold value setting means in which a voltage provided by subtracting the correction voltage from a predetermined protecting voltage is set as the threshold value.

In a preferable mode of the present invention, the voltage drop detecting means sets the differential voltage between the input voltage supplied through the harness at an unapplying time of the input voltage to the load, and the input voltage supplied through the harness at an applying time of the input voltage to the load, to the voltage drop amount of the harness.

In the present invention, the voltage drop amount of the harness is detected, and a voltage provided by subtracting the voltage drop amount of the harness from the predetermined protecting voltage is set as the threshold value. Accordingly, a judging reference voltage (threshold value) for interrupting the load electric current can be adaptively set correspondingly to kinds of the load and the harness. Further, it is possible to flexibly cope with a change of the load, a change of the harness, etc.

Further, if the resistance value of the harness is detected and the threshold value is set with this resistance value as a parameter, and the resistance value is replaced with a predetermined upper limit resistance value when this resistance value is greater than the predetermined upper limit resistance value, for example, the battery can be also protected without an obstacle under an abnormal situation such as a contact defect of a harness connector, etc.

DESCRIPTION OF THE PREFERRED EMBODIMENTS

An embodiment mode of the present invention will next be explained on the basis of the drawings. Illustration of various detailed specific and real examples, numerical values, character series and other symbols in the following explanation is strictly reference for clarifying the idea of the present invention. It is clear that no idea of the present invention is limited by all or one portion of these examples, etc. Further, with respect to a publicly known technique, a publicly known procedure, a publicly known architecture, a publicly known circuit construction, etc. (hereinafter called "publicly known matters"), an explanation over its detailed portions is avoided to clarify the explanation, and all or one portion of these publicly known matters is not intentionally excluded. Such publicly known matters can be known by a person skilled in the art at an application time point of the present invention, and are therefore naturally included in the following explanation.

Figure 1:
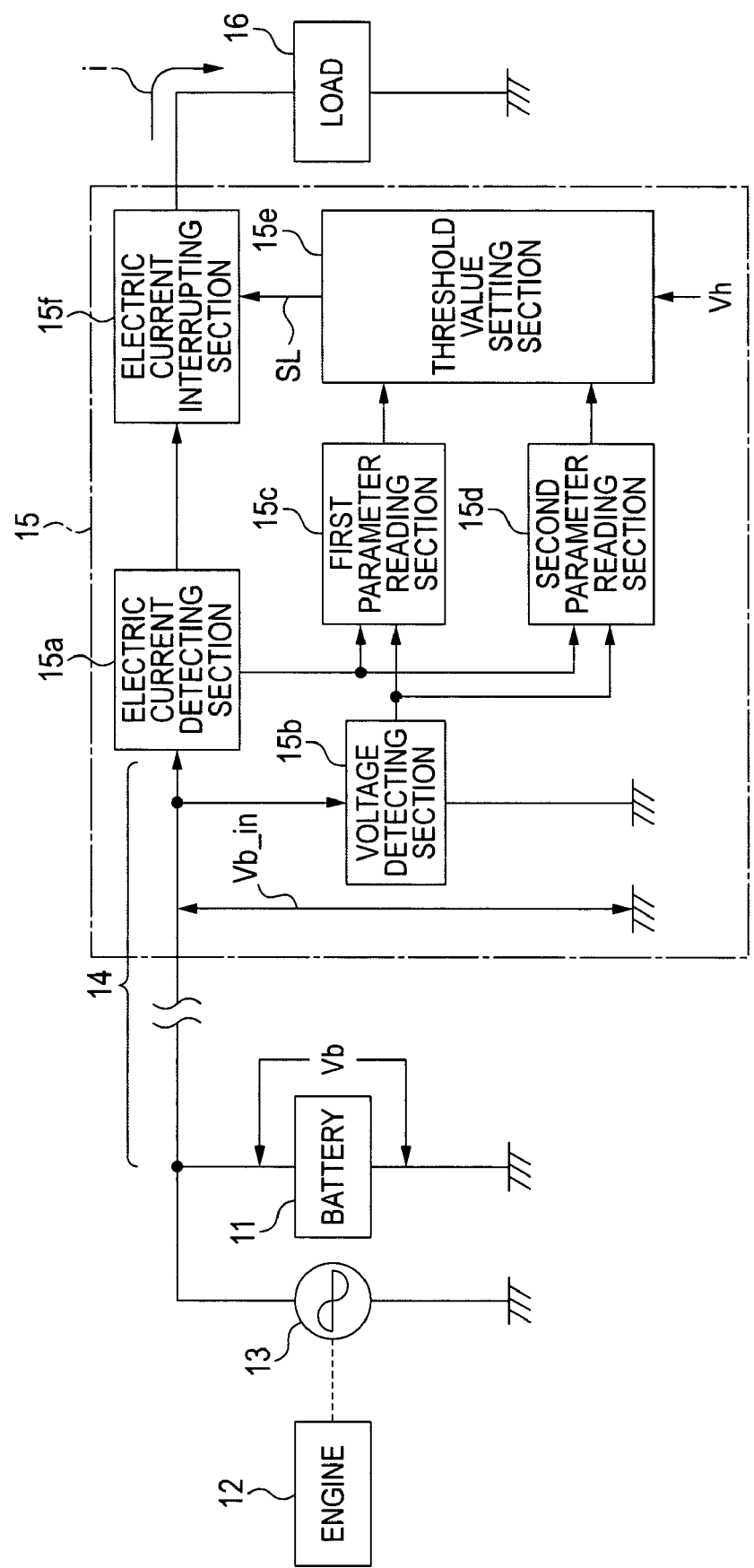
FIG. 1 is an entire constructional view of an embodiment mode.

FIG. 1 is an entire constructional view of the embodiment mode. In this figure, a battery 10 is charged by a dynamo 13 operated by an engine 12. A terminal voltage Vb of the battery 10 is supplied to load 16 through a harness 14 and an electric power controller 15.

The electric power controller 15 interrupts an electric current i to the load 16 when an input voltage (voltage Vb_in) is smaller than a threshold value SL. The load 16 is an electric mounting product for vehicle mounting of large electric power consumption, e.g., an audio system of large output, a front illuminating light of a xenon system, etc., or a domestic appliance such as television, etc. However, when the load 16 is set to the domestic appliance, the electric power controller 15 is also used as a commercial electric power converter. Namely, in this case, in addition to the above electric current interrupting function, the electric power controller 15 can convert the voltage Vb in of a load side terminal of the harness 14 into commercial electric power of AC100V and can supply this commercial electric power to the load 16.

The electric power controller 15 includes an electric current detecting section 15a, a voltage detecting section 15b, a first parameter reading section 15c, a second parameter reading section 15d, a threshold value setting section 15e and an electric current interrupting section 15f.

The voltage detecting section 15b detects the voltage Vb_in of the load side terminal of the harness 14, and the electric current detecting section 15a detects the electric current i flowed into the load 16 through the harness 14.

The first parameter reading section 15c and the second parameter reading section 15d respectively read a detecting result (voltage Vb_in) of the voltage detecting section 15b and a detecting result (electric current i) of the electric current detecting section 15a in predetermined timings. The reading timing of the first parameter reading section 15c is a turning-off time of the load 16 (at the time of electric current i=0). The reading timing of the second parameter reading section 15d is a turning-on time of the load 16 (at the time of electric current i>0).

Next, the load electric current i and the voltage Vb_in read by the first parameter reading section 15c are respectively shown by "I1" and "V1". The load electric current i and the voltage Vb_in read by the second parameter reading section 15d are respectively shown by "I2" and "V2".

The threshold value setting section 15e adaptively sets the threshold value SL on the basis of the above I1, V1, I2 and V2 and a predetermined protecting reference voltage Vh (e.g., a lowest battery voltage Vb required to start the engine 12). The electric current interrupting section 15f compares the voltage Vb_in of the load side terminal of the harness 14 and the threshold value SL adaptively set in the threshold value setting section 15e while the load 16 is turned on. The electric current interrupting section 15f interrupts the electric current i to the load 16 when Vb_in<SL is attained.

Figure 2:
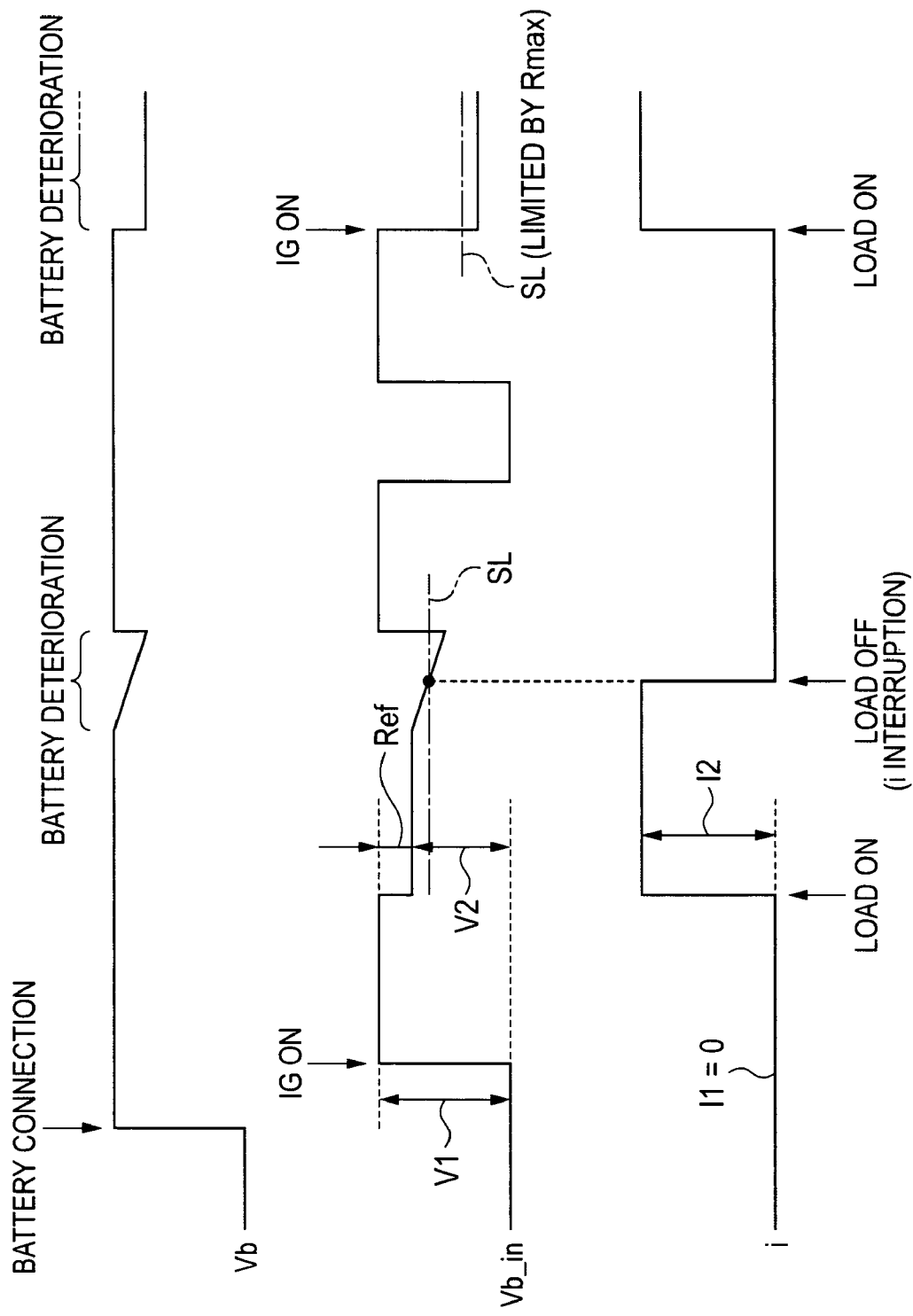
FIG. 2 is an operation waveform chart of the embodiment mode.

FIG. 2 is an operation waveform chart of the embodiment mode. An upper stage shows the waveform of the battery voltage Vb, and an intermediate stage shows the waveform of the voltage Vb_in of the load side terminal of the harness 14, and a lower stage shows the waveform of the electric current i of the load 16. In this figure, the battery voltage Vb rises from 0V when the battery 11 is connected. The battery voltage Vb is reduced when discharge is advanced (deterioration is advanced).

On the other hand, for example, when an unillustrated ignition switch is turned on (IG on), the voltage Vb_in of the load side terminal of the harness 14 rises from 0V to V1. Thereafter, when the load 16 is turned on, the voltage Vb in is reduced from V1 to V2. The difference between V1 and V2 corresponds to the product (ixR) of the actual electric current i flowed to the load 16 and the actual resistance value R of the harness 14. Namely, since Ref=ixR, Vb_in becomes V2 reduced by Ref from V1 in accordance with turning-on of the load 16.

Here, when Vb at the turning-on time of the load 16 becomes smaller than the protecting voltage Vb and the load 16 is continuously used as it is, discharge (deterioration) of the battery 11 is advanced, and no engine 12 can be finally started. Accordingly, the supply of the electric current i to the load 16 must be interrupted from a viewpoint of protection of the battery 11.

The threshold value SL in FIG. 2 is a reference voltage for its construction. When the voltage Vb_in of the load side terminal of the harness 14 during the turning-on of the load 16 becomes smaller than this threshold value SL, the electric current i to the load 16 is interrupted.

Figure 3:
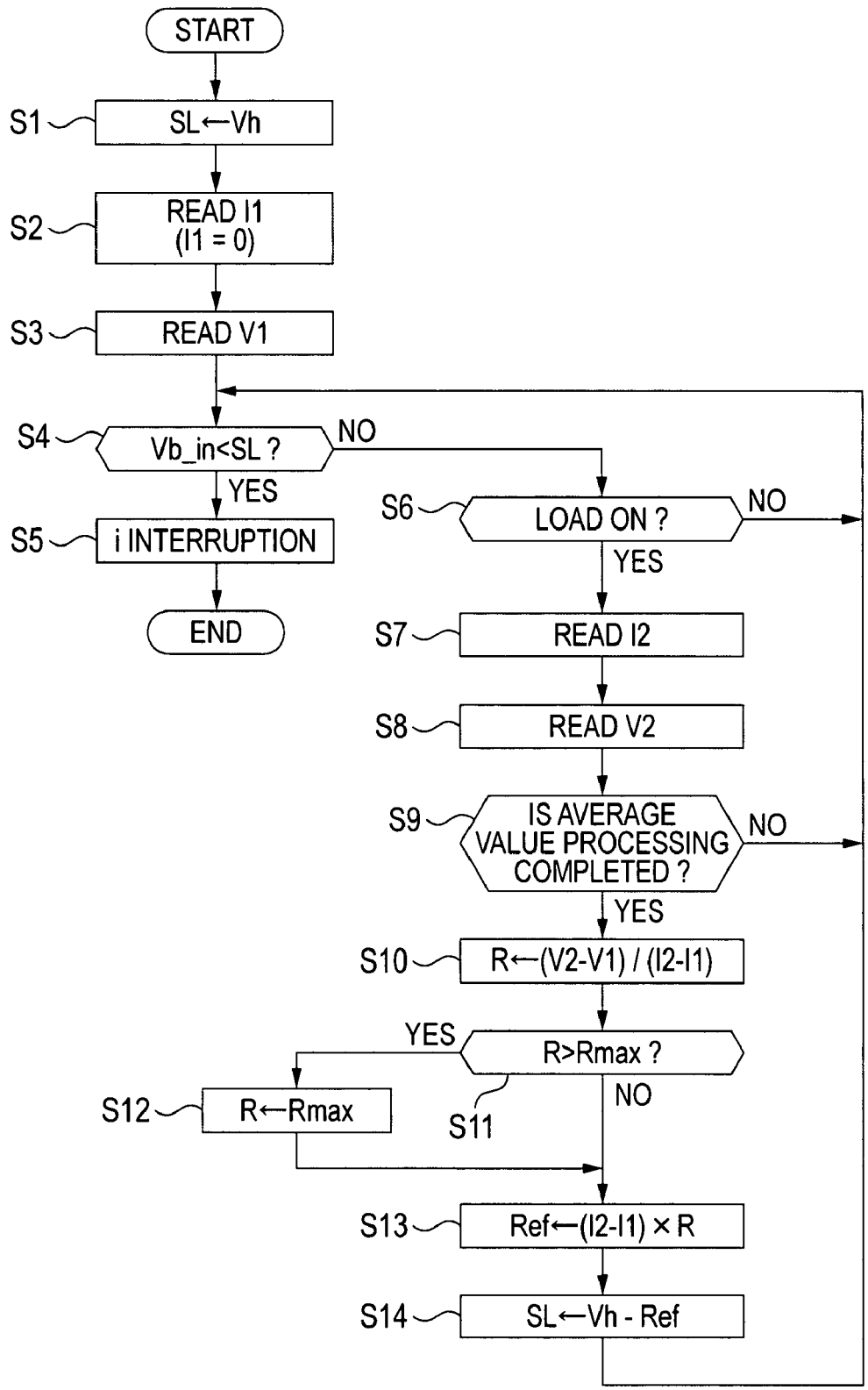
FIG. 3 is a view showing an operation flow chart of the embodiment mode.
Figure 4:
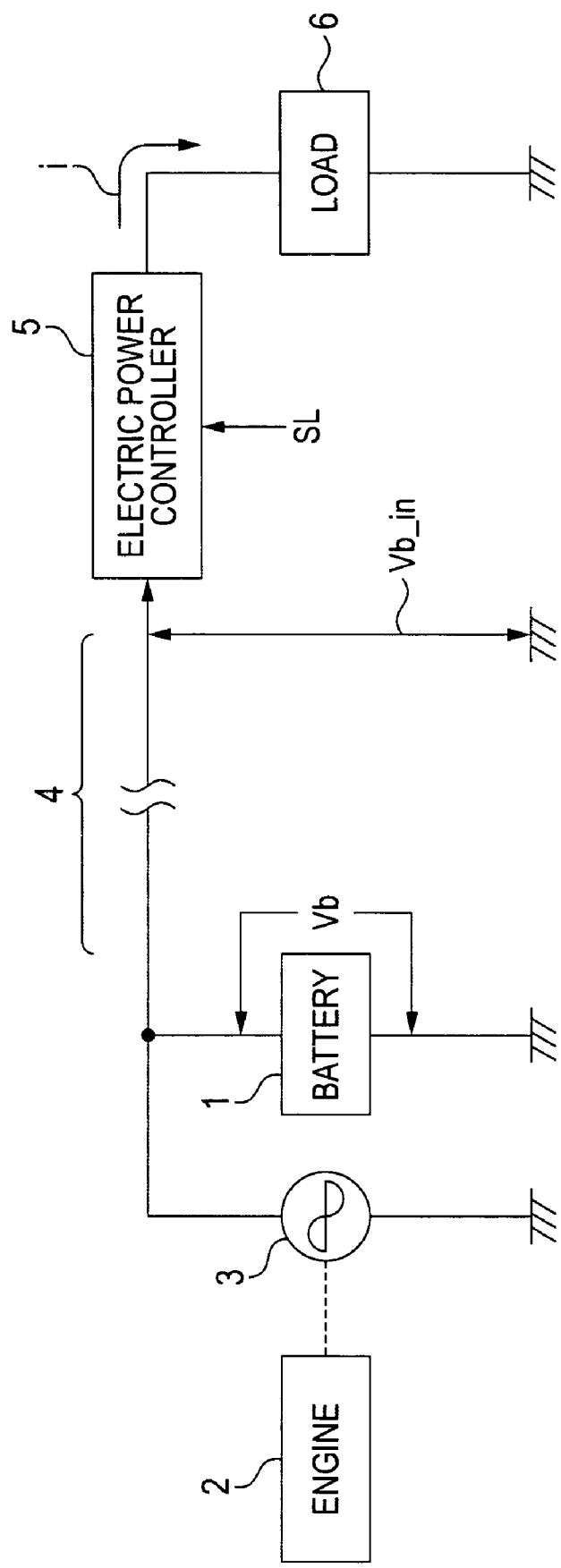
FIG. 4 is a view showing a former electric power controller for vehicle mounting.

FIG. 3 is a view showing an operation flow chart of the embodiment mode. In this flow chart, the protecting voltage Vh set in advance is first set as an initial value of the threshold value SL (step S1). Next, I1 is read from the electric current detecting section 15a (step S2), and V1 is read from the voltage detecting section 15b (step S3). At this stage, since the load 16 is turned off, the electric current i of the load 16 is 0. Accordingly, since I1=0, 0 may be also set to I1 without reading I1 in step S2.

Next, it is judged whether the input voltage Vb_in is smaller than the threshold value SL or not (step S4). However, since the threshold value SL of this stage is the protecting voltage Vh of an initial value, it is judged whether the input voltage Vb_in is smaller than the protecting voltage Vh or not. If the input voltage Vb_in is smaller than the protecting voltage Vh, the electric current i to the load 16 is interrupted to protect the battery 11 (step S4), and the flow chart is terminated. In contrast to this, if no input voltage Vb_in is smaller than the protecting voltage Vh, the following steps S6 to S14 are executed and the threshold value SL is adaptively set.

Namely, it is first judged whether the load 16 is turned on or not (step S6). If no load 16 is turned on, it is again returned to step S4. In contrast to this, if the load 16 is turned on, 12 is read from the electric current detecting section 15a (step S7), and V2 is read from the voltage detecting section 15b (step S8).

Next, it is judged whether average value processing of each of I2 and V2 is completed or not (step S9). The average value processing is processing for reading I2 and V2 several times and calculating their average values since no accurate I2 and V2 are obtained by an influence of noises, etc. in only reading of one time. When it is judged that no average value processing is completed in step S9, it is again returned to step S4. In contrast to this, when it is judged that the average value processing is completed, the actual resistance value R of the harness 14 is calculated on the basis of I1, I2, V1 and V2 (step S10). In this calculating formula, as shown in FIG. 3, R←(V2−V1)/(I2−I1) is set. Since I1=0, the resistance value R obtained from this formula is, in short, a value provided by dividing a voltage drop (V2−V1) of the harness 14 by the electric current i (i=I2−I1) flowed to the load 16.

When the actual resistance value R of the harness 14 is calculated in this way, it is next judged whether the resistance value R exceeds a predetermined upper limit resistance value Rmax or not (step S11). When the resistance value R exceeds the predetermined upper limit resistance value Rmax, the resistance value R is replaced with the upper limit resistance value Rmax (step S8b). A role of the upper limit resistance value Rmax will be explained later in detail.

When the resistance value R of the harness 14 is calculated in this way, the correction voltage Ref corresponding to the actual voltage drop (ixR) of the harness 14 is next arithmetically calculated by using this resistance value R and 12 read in the above step S7 (step S13). A value (Vh−Ref) provided by subtracting the correction voltage Ref from the predetermined protecting voltage Vh set in advance is then set to the threshold value SL (step S14), and it is again returned to the step S4.

In the above description, the threshold value SL just after the flow chart is started, is equal to the protecting voltage Vh (SL=Vh). However, the threshold value SL after the execution of steps S6 to S14 becomes a value lowered by the correction voltage Ref from the protecting voltage Vh as shown in the following formula (1).

$$SL = Vh - Ref \tag{1}$$

Here, the correction voltage Ref becomes ixR, i.e., a value provided by multiplying the difference between I2 and I1 by R as shown in the following formula (2).

$$Ref = (I2 - I1) \times R \tag{2}$$

Accordingly, the threshold value SL in this embodiment mode is adaptively set correspondingly to the product of the actual electric current i (i=I2−I1) flowed to the load 16 and the actual resistance value R of the harness 14. Namely, the threshold value SL is different from a fixed threshold value set in advance as in the related art. Accordingly, the above unconformity cases ("Ref>actual ixR" or "Ref<actual ixR") are not caused. As its result, the trouble as in the related art, i.e., the trouble that battery protecting ability is reduced, or no load can be used although performance (charging state) of the battery is sufficient, is not caused.

This matter will be specifically explained. For example, when i=10A and R=0.2Ω are set, Ref=ixR=2V is formed. Accordingly, if Vh=8V is set, SL=8V−2V=6V is formed. Accordingly, in this case, when Vb_in becomes lower than 6V, the electric current i to the load 16 is interrupted.

Here, it is supposed that the load 16 is changed. For example, when i=20A is attained, Ref=ixR=4V is formed in this case. Accordingly, SL=8V−4V=4V is formed, and the electric current i to the load 16 is interrupted when Vb_in becomes smaller than 4V. Otherwise, when i=5A is attained, Ref=ixR=1V is formed so that SL=8V−1V=7V is formed. In this case, when Vb in becomes smaller than 7V, the electric current i to the load 16 is interrupted.

Otherwise, a case for changing the harness 14 while i=10A is formed, will be supposed. For example, when R=0.1Ω is attained, Ref=ixR=1V is formed so that SL=8V−1V=7V is formed. In this case, when Vb_in becomes smaller than 7V, the electric current i to the load 16 is interrupted. Otherwise, when R=0.5Ω is attained, Ref=ixR=0.5V is formed so that SL=8V−1V=7.5V is formed. In this case, when Vb_in becomes smaller than 7.5V, the electric current i to the load 16 is interrupted.

Thus, in this embodiment mode, the threshold value SL can be adaptively set on the basis of the actual electric current i flowed to the load 16 and the actual resistance value R of the harness 14, and it is possible to flexibly cope with changes of the load 16 and the harness 14. Further, even when the electric power controller 15 of this embodiment mode is ridden and replaced in another vehicle, the electric power controller 15 can be used as it is without any obstacle. Otherwise, when the electric power controller 15 of this embodiment mode is also used as the commercial electric power converter explained in the beginning and an electric product connected to this electric power controller 15 is changed, it can be set to the threshold value SL corresponding to consumed electric power of the electric product, and the battery 11 can be protected without an obstacle.

Further, in this embodiment mode, when the resistance value R of the harness 14 arithmetically calculated in step S10 exceeds the upper limit resistance value Rmax, the resistance value R of the harness 14 is limited by its upper limit resistance value Rmax (R←Rmax). Accordingly, for example, it is possible to avoid trouble when an abnormal resistance value R is arithmetically calculated by a contact defect, etc. of a connector of the harness 14.

This trouble will be explained. The length of the harness for a vehicle is generally about 7 m at its maximum, and the resistance value R of the entire harness is a small value of a decimal point or less even when contact resistance of the connectors of both ends of the harness is considered. For example, conductor resistance of AVSS0.85 cable often used in the harness for a vehicle is 21.7 mΩ/m. Accordingly, if the length of the harness is 7 m, it is mere 7 m×21.7 mΩ/m=0.1519Ω. Even when the contact resistance of the connector is added to this value, it does not probably exceed 0.2Ω.

Here, when i=10A and R=0.2Ω are set, Ref=2V is attained. Accordingly, if Vh=8V is set, SL=6V is attained. When Vb_in becomes smaller than 6V, the electric current i to the load 16 is interrupted. A case in which R=0.8Ω is attained by a contact defect of the connector of the harness 14 will now be considered. In this case, Ref=8V is attained. Accordingly, similar to the above case, if Vh=8V is set, SL=0V is attained and the trouble of being unable to protect the battery 11 at all is caused.

The upper limit resistance value Rmax is a measure for avoiding such trouble for the following reasons. Namely, if Rmax=0.2Ω is set, it is limited to R=Rmax=0.2Ω even if R=0.8Ω is attained as mentioned above. Accordingly, there is no case in which the threshold value SL abnormally becomes small. The battery 11 can be protected without an obstacle. SL (limited by Rmax) of the right-hand side of FIG. 2 shows the threshold value SL when R is limited by Rmax. The threshold value SL does not become smaller than this value.

Rmax=0.2Ω is merely one example of convenience of the explanation. An appropriate value may be naturally set in accordance with the conductor resistance and length of the harness, the normal contact resistance of the connector, etc.

What is claimed is:

1. An electric power controller for vehicle mounting in which an input voltage supplied through a harness and a threshold value are compared, and the input voltage applied to load is interrupted when said input voltage is smaller than the threshold value; the electric power controller for vehicle mounting comprising:
    voltage drop detecting means for detecting a voltage drop amount of said harness; and
    threshold value setting means in which a voltage provided by subtracting the voltage drop amount of said harness from a predetermined protecting voltage is set as said threshold value.

2. An electric power controller for vehicle mounting in which an input voltage supplied through a harness and a threshold value are compared, and the input voltage applied to load is interrupted when said input voltage is smaller than the threshold value;
    the electric power controller for vehicle mounting comprising:
    voltage drop detecting means for detecting a voltage drop amount of said harness;
    electric current detecting means for detecting an electric current flowed to said load;
    resistance value arithmetic means for arithmetically calculating a resistance value of said harness from the voltage drop amount of said harness and the electric current flowed to said load;
    resistance value replacing means for outputting the resistance value as it is if no resistance value arithmetically calculated by said resistance value arithmetic means is greater than a predetermined upper limit resistance value, and replacing the resistance value with the upper limit resistance value and outputting this upper limit resistance value if the resistance value is greater than the predetermined upper limit resistance value;
    correction voltage arithmetic means for calculating a product of the resistance value outputted from said resistance value replacing means and the electric current flowed to said load, and setting its result to a correction voltage; and
    threshold value setting means in which a voltage provided by subtracting said correction voltage from a predetermined protecting voltage is set as said threshold value.

3. The electric power controller for vehicle mounting according to claim 1, wherein said voltage drop detecting means sets the differential voltage between the input voltage supplied through said harness at an unapplying time of the input voltage to said load, and the input voltage supplied through said harness at an applying time of the input voltage to said load, to the voltage drop amount of said harness.

4. The electric power controller for vehicle mounting according to claim 2, wherein said voltage drop detecting means sets the differential voltage between the input voltage supplied through said harness at an unapplying time of the input voltage to said load, and the input voltage supplied through said harness at an applying time of the input voltage to said load, to the voltage drop amount of said harness.

* * * * *